United States Patent
Ren et al.

(10) Patent No.: US 12,025,879 B2
(45) Date of Patent: Jul. 2, 2024

(54) DISPLAY MODULE

(71) Applicant: WUHAN CHINA STAR OPTOELECTRONICS TECHNOLOGY CO., LTD., Wuhan (CN)

(72) Inventors: Yuanyuan Ren, Wuhan (CN); Youcheng Wang, Wuhan (CN); Xuefeng Wang, Wuhan (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/298,537

(22) PCT Filed: Apr. 30, 2021

(86) PCT No.: PCT/CN2021/091434
§ 371 (c)(1),
(2) Date: May 28, 2021

(87) PCT Pub. No.: WO2022/222179
PCT Pub. Date: Oct. 27, 2022

(65) Prior Publication Data
US 2024/0012287 A1  Jan. 11, 2024

(30) Foreign Application Priority Data
Apr. 22, 2021  (CN) .......................... 20210435536.6

(51) Int. Cl.
*G02F 1/13357* (2006.01)
*F21V 8/00* (2006.01)

(52) U.S. Cl.
CPC ..... *G02F 1/133608* (2013.01); *G02B 6/0088* (2013.01); *G02B 6/0093* (2013.01)

(58) Field of Classification Search
CPC ................................................ G02F 1/133608
See application file for complete search history.

(56) References Cited

U.S. PATENT DOCUMENTS

2007/0182880 A1* 8/2007 Yamada ............ G02F 1/133608
349/61
2011/0157914 A1  6/2011 Chang
(Continued)

FOREIGN PATENT DOCUMENTS

| CN | 104679339 A | 6/2015 |
|---|---|---|
| CN | 204459960 U | 7/2015 |

(Continued)

OTHER PUBLICATIONS

Chinese Office Action issued in corresponding Chinese Patent Application No. 202110435536.6 dated Apr. 20, 2022, pp. 1-7.
(Continued)

*Primary Examiner* — Eric T Eide
(74) *Attorney, Agent, or Firm* — PV IP PC; Wei Te Chung; Zhigang Ma

(57) ABSTRACT

A display module provided by this application includes a backlight module, a display panel, and a sealing structure. The backlight module includes a backplane and a backlight assembly. The backplate includes a bottom wall and side walls provided on side edges of the bottom wall. The bottom wall and the side walls enclose an accommodation space, the bottom wall has a hollow area, and the backlight assembly is disposed in the accommodation space. A sealing structure is connected with the bottom wall and seals the accommodation space, which can prevent water vapor, dust, and other impurities from entering the display module from an edge of the hollow area to cause wrinkle and deformation or damage to a light guide plate or film layers in the display panel.

8 Claims, 5 Drawing Sheets

(56) References Cited

U.S. PATENT DOCUMENTS

| | | | | |
|---|---|---|---|---|
| 2013/0223066 | A1* | 8/2013 | Kim | G02F 1/133615 |
| | | | | 362/235 |
| 2015/0205166 | A1* | 7/2015 | Kageyama | G02F 1/133608 |
| | | | | 349/58 |
| 2018/0364517 | A1* | 12/2018 | Oh | G02F 1/133606 |
| 2021/0132432 | A1* | 5/2021 | Sasaki | G02F 1/13332 |
| 2021/0271136 | A1* | 9/2021 | Kobayashi | G02F 1/133603 |
| 2023/0146381 | A1* | 5/2023 | Zhou | G03B 21/006 |
| | | | | 349/5 |

FOREIGN PATENT DOCUMENTS

| | | |
|---|---|---|
| CN | 205003409 U | 1/2016 |
| CN | 108037620 A | 5/2018 |
| CN | 108254975 A | 7/2018 |
| CN | 210181948 U | 3/2020 |
| CN | 211348931 U | 8/2020 |
| CN | 211858009 U | 11/2020 |
| JP | 2004273156 A | 9/2004 |
| TW | M332207 U | 5/2008 |

OTHER PUBLICATIONS

International Search Report in International application No. PCT/CN2021/091434, mailed on Sep. 3, 2021.
Written Opinion of the International Searching Authority in International application No. PCT/CN2021/091434, mailed on Sep. 3, 2021.

* cited by examiner

DISPLAY MODULE

RELATED APPLICATIONS

This application is a Notional Phase of PCT Patent Application No. PCT/CN2021/091434 having international filing date of Apr. 30, 2021, which claims the benefit of priority of Chinese Patent Application No. 202110435536.6 filed on Apr. 22, 2021. The contents of the above applications are all incorporated by reference as if fully set forth herein in their entirety.

FIELD OF INVENTION

This application relates to a field of display technology, in particular to a display module.

BACKGROUND OF INVENTION

Liquid crystal displays have advantages of less power consumption and soft images, and they are widely used. Current liquid crystal display modules are formed by stacking and assembling a display panel, a backlight assembly, etc. into a backplate. In order to reduce weight of the liquid crystal display modules, a hollow area is generally formed on a backplate. However, after forming the hollow area, water vapor would easily enter a display module from a position of the hollow area, causing wrinkles and deformation to components or membrane materials in the display module, resulting in abnormal display images and affecting display quality.

Technical Problem

A display module is provided to solve a technical problem that current liquid crystal display modules are easy to cause poor display quality due to easy entry of water vapor.

SUMMARY OF INVENTION

In a first aspect, the present application provides a display module, including: a backlight module including a backplate and a backlight assembly, wherein the backplate include a bottom wall and side walls provided on side edges of the bottom wall, the bottom wall and the side walls encircle an accommodation space, the bottom wall has a hollow area, the backlight assembly is disposed in the accommodation space, and the backlight assembly includes a light reflector and a light guide plate stacked on the bottom wall; a display panel disposed on a side of the backlight assembly away from the bottom wall; and a sealing structure connected to the bottom wall and sealing the accommodation space.

Alternatively, the sealing structure includes a sealing plate connected to the bottom wall and covering the hollow area to seal the hollow area.

Alternatively, the sealing plate is disposed between the bottom wall and the backlight assembly.

Alternatively, the bottom wall has a first side surface away from the backlight assembly, and the sealing plate is disposed on the first side surface.

Alternatively, the bottom wall has a second side surface close to the backlight assembly, the second side surface is recessed close to an edge of the hollow area to form an indentation area, and an edge of the sealing plate is connected with a bottom surface of the indentation area.

In a second aspect, the present application provides a display module, including: a backlight module including a backplate and a backlight assembly, wherein the backplate includes a bottom wall and side walls provided on side edges of the bottom wall, the bottom wall and the side walls encircle an accommodation space, and the bottom wall has a hollow area; a display panel disposed on a side of the backlight assembly away from the bottom wall; and a sealing structure connected with the bottom wall and sealing the accommodation space.

Alternatively, the sealing structure includes a sealing plate connected to the bottom wall and covering the hollow area to seal the hollow area.

Alternatively, the sealing plate is disposed between the bottom wall and the backlight assembly.

Alternatively, the bottom wall has a first side surface away from the backlight assembly, and the sealing plate is disposed on the first side surface.

Alternatively, the bottom wall has a second side surface close to the backlight assembly, the second side surface is recessed close to an edge of the hollow area to form an indentation area, and an edge of the sealing plate is connected with a bottom surface of the indentation area.

Alternatively, a thickness of the sealing plate is less than or equal to a depth of the indentation area.

Alternatively, the depth of the indentation area is greater than or equal to 0.05 mm and less than or equal to 0.1 mm.

Alternatively, the thickness of the sealing plate is greater than or equal to 0.02 mm and less than or equal to 0.05 mm.

Alternatively, an adhesive layer is disposed on a surface of the bottom wall corresponding to the sealing plate, and a surface of the sealing plate facing the bottom wall is attached to the adhesive layer.

Alternatively, the adhesive layer includes sticking sections distributed along a circumferential direction of the sealing plate, and any two of the sticking sections are arranged at intervals.

Alternatively, a gap between the two adjacent sticking sections is less than or equal to 0.2 mm.

Alternatively, the adhesive layer extends along a circumferential direction of the sealing plate to form a ring structure.

Alternatively, the sealing structure includes a sealant, the sealant is respectively connected to an edge of the hollow area and a side of the backlight assembly close to the bottom wall to seal a gap between the bottom wall and the backlight assembly.

Alternatively, a thickness of the backplate is greater than or equal to 0.15 mm and less than or equal to 0.3 mm.

Alternatively, a material of the sealing plate includes a resin.

The display module provided by this application includes a backlight module, a display panel, and a sealing structure. The backlight module includes a backplane and a backlight assembly. The backplane includes a bottom wall and side walls provided on side edges of the bottom wall. The bottom wall and the side walls form an accommodation space, and the bottom wall has a hollow area. The backlight assembly is disposed in the accommodation space, the display panel is stacked on a side of the backlight assembly away from the bottom wall, and the sealing structure is connected with the bottom wall and sealing the accommodation space. By providing the sealing structure, it is possible to prevent water vapor, dust, and other impurities from entering the display module from an edge of the hollow area, causing a light guide plate or film layers of the display panel to wrinkle, deform, or damage. This avoids a problem of poor display quality of the display module in a high temperature and high humidity environment or a dusty environment.

DESCRIPTION OF DRAWINGS

Hereinafter, specific implementations of the present application will be described in detail with reference to the accompanying drawings, so as to make the technical solutions and other beneficial effects of the present application easy to understand.

Figure 1:
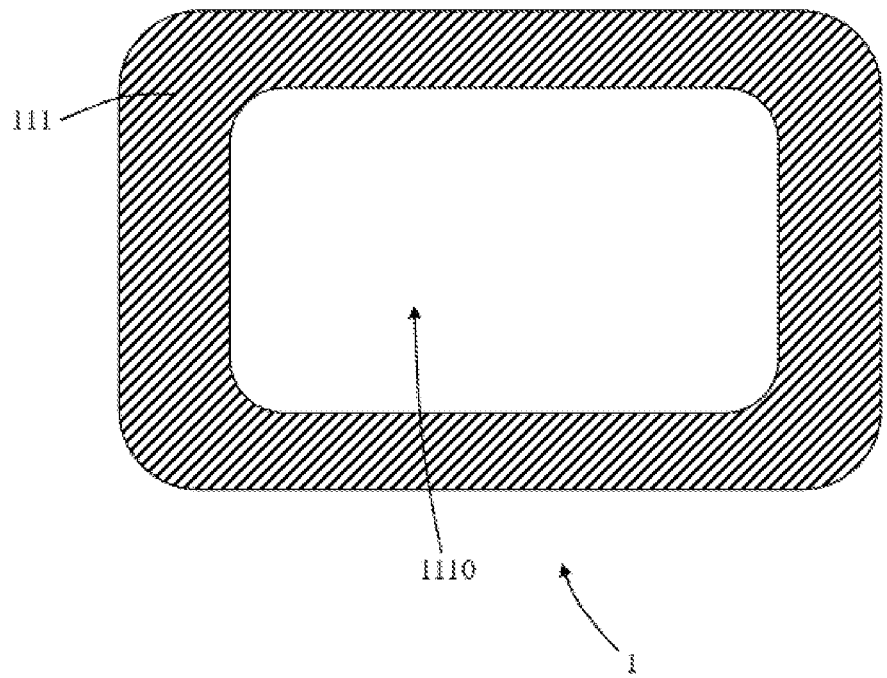
FIG. 1 is a back view of a display module in prior art.

REFERENCE NUMERALS display module 1, backlight module 11, backplate 111, bottom wall 1111, accommodation space 110, display panel 12, side wall 1112, color filter substrate 122, polarizer 121, fixing tape 13, array substrate 123, sealing structure 14, hollow area 1110, adhesive layer 142, sealing plate 141, backlight assembly 112, sealant 143, light reflector 1121, light guide plate 1122, brightness enhancement film 1123, diffusion film 1124, first side surface 1111a, plastic frame 113, adhesive strip 114, second side surface 1111b, sticking section 1421, side 1113, color filter substrate polarizer 1211, array substrate polarizer 1212, indentation area 1114, gap 1420, width d.

DETAILED DESCRIPTION OF PREFERRED EMBODIMENTS

The following describes the technical solutions in the embodiments of the present application clearly and completely with reference to the drawings in the embodiments of the present application. Obviously, the embodiments are only a part of the embodiments of the present application, rather than all the embodiments. Based on these embodiments in this application, all other embodiments obtained by those skilled in the art without creative work shall fall within the protection scope of this application. In addition, it should be understood that the specific implementations described herein are used to illustrate and explain the application only, and are not used to limit the application. In this application, if no explanation is made to the contrary, the orientation terms such as "upper" and "lower" usually refer to the upper and lower sides of the device in actual use or working state. Specifically, it refers to the direction of the figures in the drawings, and "inner" and "outer" refer to the outline of the device.

The embodiments of the present application provide a display module, which will be described in detail below. It should be noted that an order of description in the following embodiments is not meant to limit a preferred order of the embodiments.

This application provides a display module, which will be described in detail below.

FIG. 1 is a schematic top view of a display module 1 in prior art. The display module 1 includes a backplate 111. In order to reduce its weight, a hollow area 1110 is provided on the backplate 111. However, because the hollow area 1110 is provided, impurities such as water vapor or dust in the environment can easily enter display module 1 from an edge of the hollow area 1110. The light guide plate 1122 in the display module 1 is generally made of polymethyl methacrylate (PMMA) material, which is more sensitive to temperature and humidity. Wrinkles and deformation are prone to occur in a high humidity environment. In addition, the film materials in the display panel 12 are also susceptible to deformation due to the influence of water vapor in a high humidity environment, resulting in abnormal display images by the display module 1.

Figure 2:
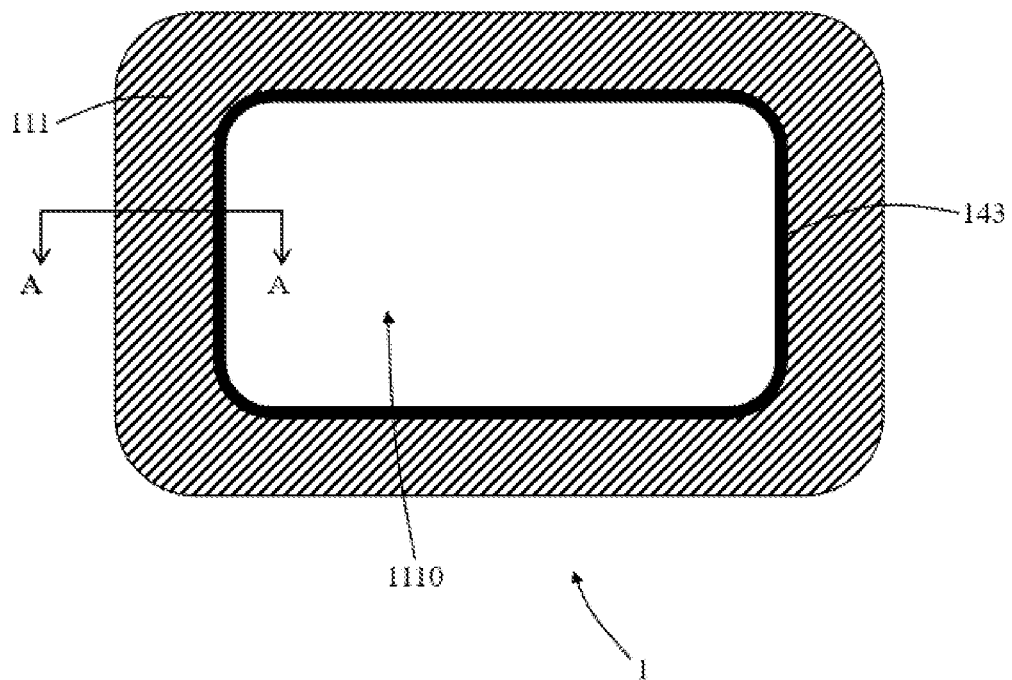
FIG. 2 is a back view of a display module in a first embodiment of this application.
Figure 6:
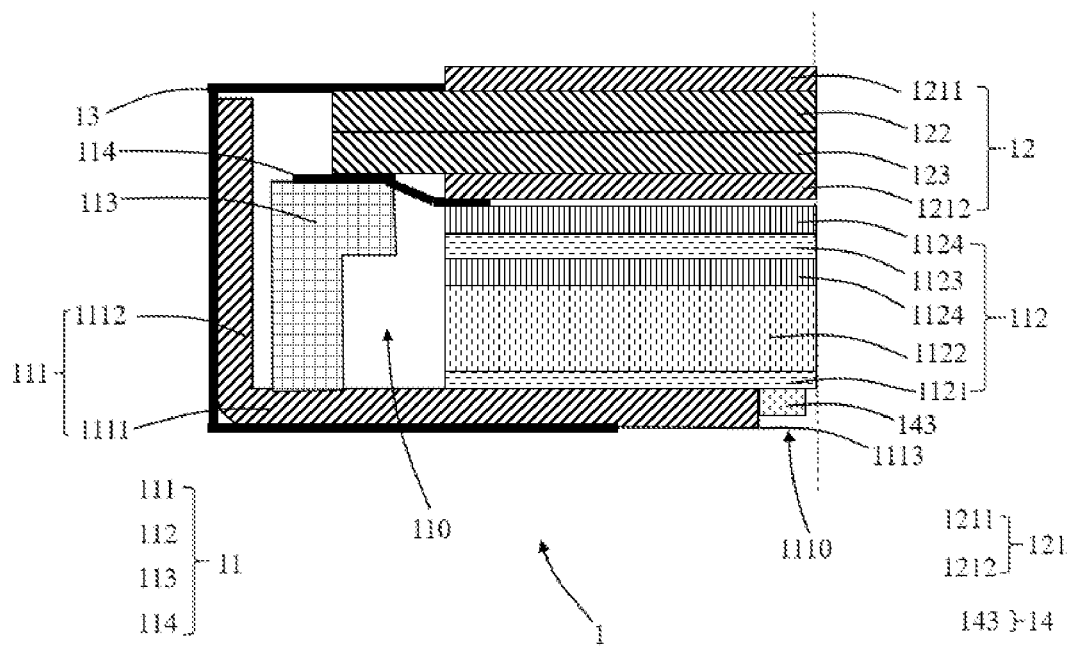
FIG. 6 is a structural schematic diagram of a cross-section of the display module according to the first embodiment of this application.

FIG. 2 is a top view of display module 1 according to a first embodiment of this application. FIG. 6 is a structural schematic diagram at cross-section A of FIG. 2. With reference to FIG. 2 and FIG. 6 together, the display module 1 includes a backlight module 11, a display panel 12, and a sealing structure 14. The backlight module 11 includes a backplate 111 and a backlight assembly 112. The backplate 111 includes a bottom wall 1111 and side walls 1112 provided on side edges of the bottom wall 1111. That is, side edges of the bottom wall 1111 are bent to form side walls 1112, and the bottom wall 1111 and the side walls 1112 encircle an accommodation space 110. The material of the backplate 111 is generally aluminum or stainless steel, and its thickness is generally 0.15 mm, 0.2 mm, 0.25 mm, or 0.3 mm. In order to reduce the weight of the display module 1, a hollow area 1110 is provided on the bottom wall 1111.

It should be noted that the size, shape, and position of the hollow area 1110 can be determined according to actual weight reduction requirements. The details are not limited herein, but the structural integrity of the bottom wall 1111 of the backplate 111 and support of the bottom wall 1111 to the backlight assembly 112 need to be ensured.

The backlight assembly 112 is disposed in the accommodation space 110. It includes a light reflector 1121, a light guide plate 1122, a brightness enhancement film 1123, and a diffusion film 1124 stacked on the bottom wall 1111. The backlight assembly 112 cooperates with a light source (not shown in the figure), the light reflector 1121, and the light guide plate 1122 to provide backlight to the display panel 12. The display panel 12 is stacked on a side of the backlight assembly 112 away from the bottom wall 1111. That is, the display panel 12 is disposed on the light guide plate 1122. The display panel 12 includes a color filter substrate 122 and an array substrate 123. The color filter substrate 122 is provided with a color filter substrate polarizer 1211. The array substrate 123 is provided with an array substrate polarizer 1212, and a diffusion film 1124 and a brightness enhancement film 1123 are disposed between the color filter substrate 122 and the light guide plate 1122 to enhance brightness and improve display effect.

The backlight module 11 further includes a plastic frame 113 disposed in the accommodation space 110 close to a side wall 1112, one end of the plastic frame 113 is connected with the bottom wall 1111, and the other end of the plastic frame 113 is connected with the array substrate 123 of the display panel 12 to support the display panel 12. The backplane 111 and the color filter substrate 122 of the display panel 12 are fixedly connected by a fixing tape 13. The plastic frame 113 and the array substrate 123 of the display panel 12, and the diffusion film 1124 and the polarizer 121 of the display panel 12 can be fixedly connected by an adhesive strip 114 to improve the rigidity and stability of the structure.

As shown in FIG. 6, in the first embodiment of the present application, the sealing structure 14 includes a sealant 143. The sealant 143 is respectively connected to an edge of the hollow area 1110 and a side of the backlight assembly 112 close to the bottom wall 1111. That is, the sealant 143 is disposed between a side 1113 of the bottom wall 1111 and a light reflector 1121 of the backlight assembly 112 to seal the gap 1420 between the bottom wall 1111 and the backlight assembly 112.

By applying the sealant 143 to the edge of the hollow area 1110 and between the bottom wall 1111 and the backlight assembly 112, the accommodation space 110 can be sealed, which prevents impurities such as water vapor from entering the accommodation space 110 from a gap 1420 between the bottom wall 1111 of the backplane 111 and the backlight assembly 112. This avoids the problem of poor display quality caused by deformation of the light guide plate 1122 in the display module 1 or film materials in the display panel 12. In addition, because the sealant 143 only needs to be applied to the side edges of the hollow area 1110, fewer materials are required, the cost is reduced, and the process is easy to implement.

Figure 3:
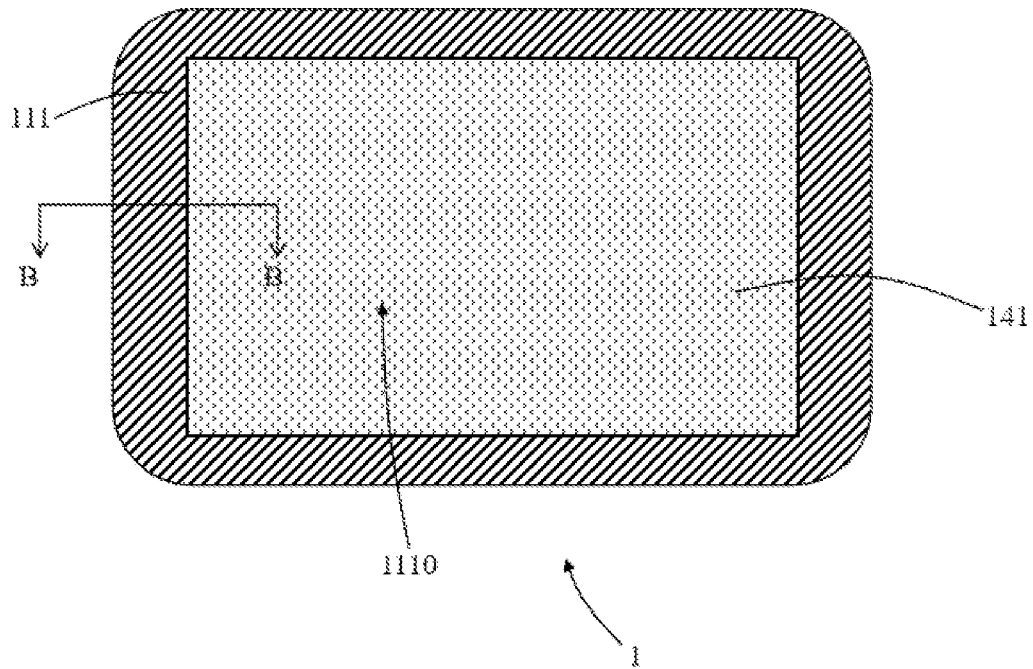
FIG. 3 is a back view of a display module according to a second, third, and fourth embodiments of this application.
Figure 7:
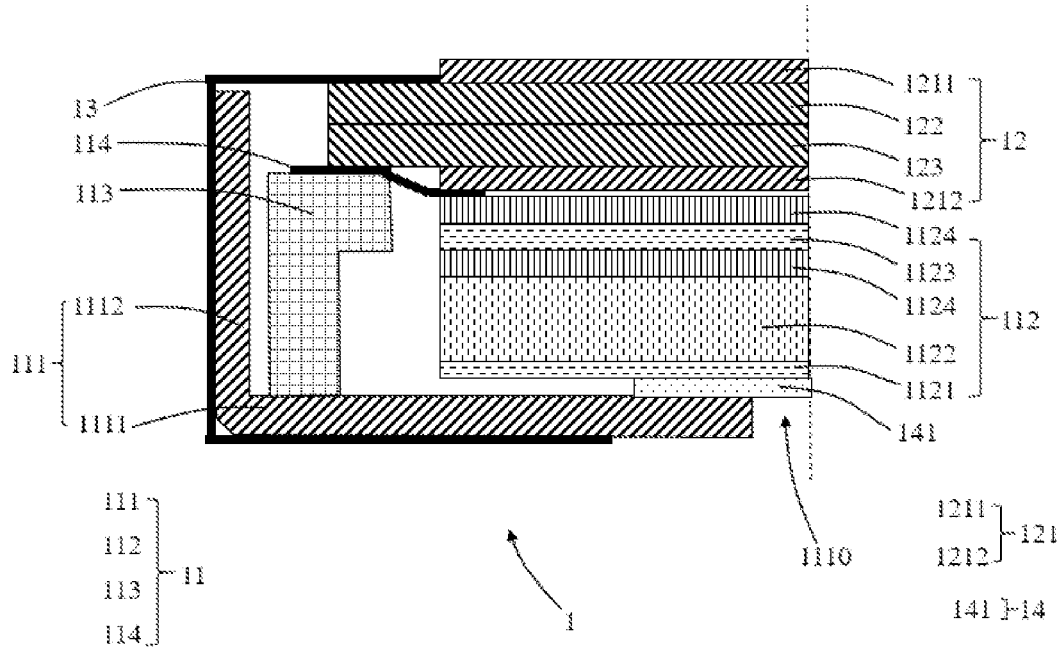
FIG. 7 is a structural schematic diagram of a cross-section of the display module according to the second embodiment of this application.

FIG. 7 is a structural schematic diagram at cross-section B of FIG. 3. In order to better isolate impurities such as water vapor and prevent the deformation of the light reflector 1121 in the backlight assembly 112 from affecting the display effect, as shown in FIG. 3 and FIG. 7, in the second embodiment of the present application, the sealing structure 14 includes a sealing plate 141, which is disposed between the bottom wall 1111 and the backlight assembly 112. That is, the sealing plate 141 is disposed between the bottom wall 1111 and the light reflector 1121 in the backlight assembly 112 and is connected to the bottom wall 1111.

Because the area of the sealing plate 141 is larger than the area of the hollow area 1110, the sealing plate 141 can cover and seal the hollow area 1110, so that the sealing plate 141 can seal the accommodation space 110. That is, the light reflector 1121 is isolated from the external environment of display module 1 to prevent the light reflector 1121 from being deformed due to the influence of external water vapor and other impurities, and further reduce the risk of poor display quality of the display module 1.

By providing a sealing structure 14 in the display module 1, connecting the sealing structure 14 with the bottom wall 1111, and sealing the hollow area 1110, water vapor, dust, and other impurities can be prevented from entering display module 1 from the edge of the hollow area 1110 and causing the light guide plate 1122 or the film material of the display panel 12 to be wrinkled and deformed or damaged. This avoids the problem of poor display quality of display module 1 in a high temperature and high humidity environment or a dusty environment.

In the embodiment provided by this application, the material of the sealing plate 141 is polyethylene terephthalate (PET), its density is much less than density of metal materials such as aluminum or stainless steel, so it would not affect the weight reduction of the display module 1. It is understandable that the sealing plate 141 can also be made of other materials with less density, which can be determined according to the actual situation and it is not limited herein.

Figure 8:
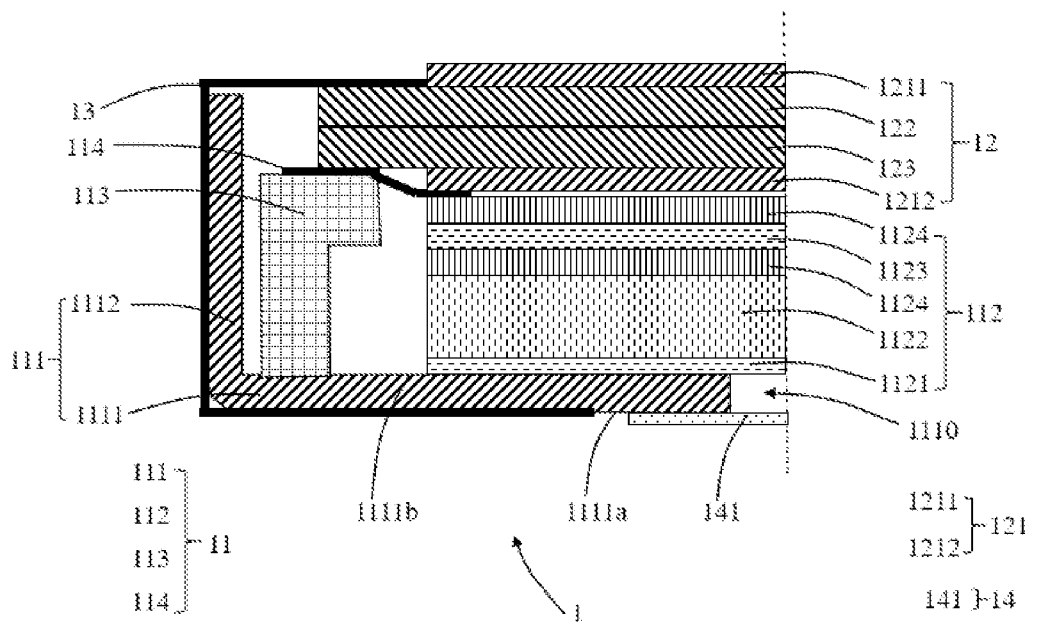
FIG. 8 is a structural schematic diagram of a cross-section of the display module according to the third embodiment of this application.

It should be noted that the sealing plate 141 is not limited to being disposed between the bottom wall 1111 and the backlight assembly 112, it can also be disposed on the side of the bottom wall 1111 away from the backlight assembly 112. FIG. 8 is a structural schematic diagram at cross-section B of FIG. 3. Referring to FIG. 3 and FIG. 8 together, in the third embodiment provided by the present application, the bottom wall 1111 has a first side surface 1111*a* away from the backlight assembly 112, and the sealing plate 141 is disposed on the first side surface 1111*a*. The sealing plate 141 and the bottom wall 1111 can be fixed by an adhesive. The sealing plate 141 covers the hollow area 1110 and seals the hollow area 1110 to prevent water vapor or dust from entering the inside of the display module 1.

By disposing the sealing plate 141 on the first side surface 1111*a* of the bottom wall 1111 away from the backlight assembly 112, the installation of the sealing plate 141 will not affect the installation of the display module 1 on the backplate 111, and the manufacturing and assembly process of the current display module 1 does not need to be changed, which makes assembly easier. The sealing plate 141 and the first side surface 1111*a* of the bottom wall 1111 can be fixed by an adhesive layer.

Figure 9:
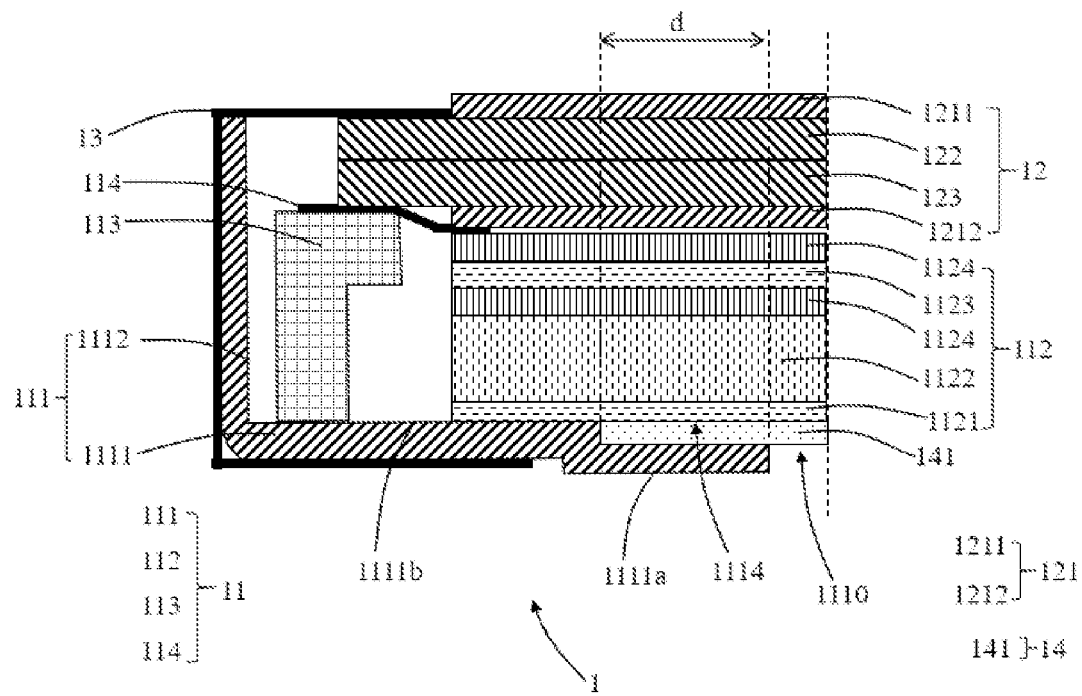
FIG. 9 is a structural schematic diagram of a cross-section of the display module according to the fourth embodiment of this application.

FIG. 9 is a structural schematic diagram at cross-section B of FIG. 3. Please refer to FIG. 3 and FIG. 9 together, in a fourth embodiment provided by this application, the bottom wall 1111 has a second side surface 1111*b* close to the backlight assembly 112, and the second side surface 1111*b* is recessed near the edge of the hollow area 1110 to form an indentation area 1114, that is, the backplate 111 has a height difference near the edge of the hollow area 1110. The edge of the sealing plate 141 is connected to the bottom surface of the indentation area 1114, that is, the edge of the sealing plate 141 is disposed in the indentation area 1114.

By recessing the edge of the bottom wall 1111 of the backplate 111 near the hollow area 1110 to form an indentation area 1114, and connect the edge of the sealing plate 141 with the bottom surface of the indentation area 1114, it can be avoided when the sealing plate 141 is disposed between the bottom wall 1111 and the backlight assembly 112, the sealing plate 141 pushes up the reflector 112 of the backlight assembly 112, which affects the display effect.

Figure 10:
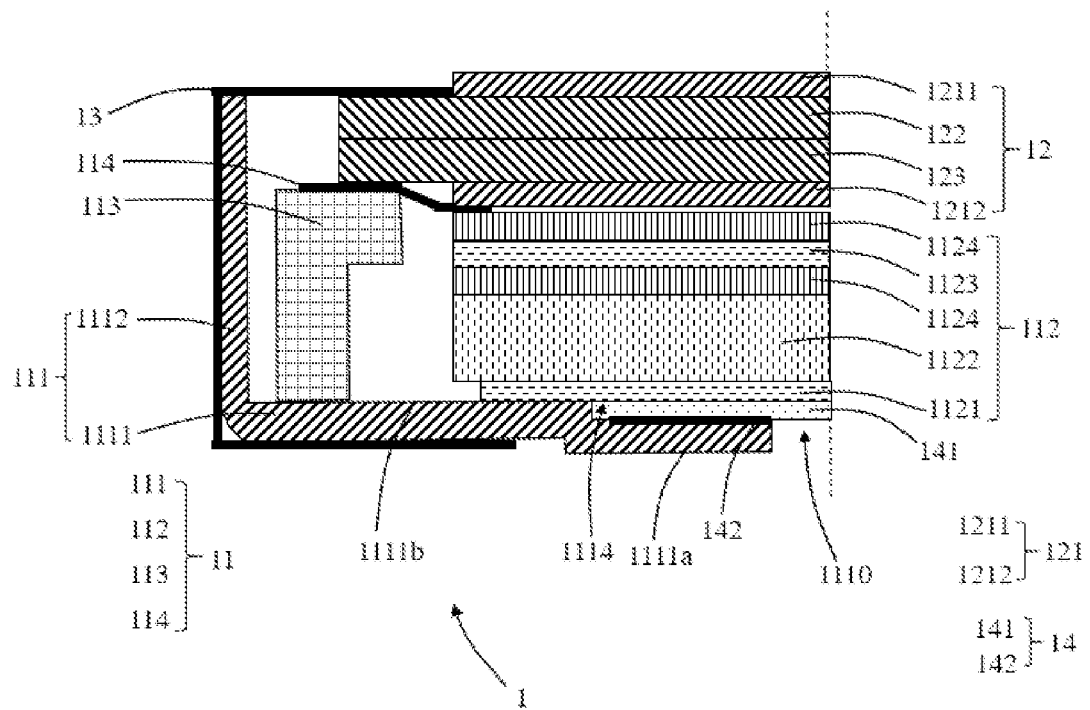
FIG. 10 is a structural schematic diagram of a cross-section of the display module according to the fifth embodiment of this application.

Please refer to FIG. 9 and FIG. 10. The indentation area 1114 is formed by stamping the second side surface 1111*b* of the bottom wall 1111, so while the depression is formed on the second side surface 1111*b*, the protrusion is formed on the first side surface 1111*a*. The indentation area 1114 is formed by stamping, which is easier to realize in the process. It should be noted that the indentation area 1114 can also be formed by digging out part of the material on the second side surface 1111*b*, which is not limited herein.

It should be noted that the width d of the indentation area 1114 can be determined according to the actual situation. Please refer to FIG. 9, that is, the indentation area 1114 may extend inward along the direction from the side walls 1112 to the backlight assembly 112, or it may extend outward along the direction from the backlight assembly 112 to the side walls 1112, and the width d of the indentation area 1114 is not limited herein.

In order to prevent the sealing plate 141 from pushing up the light reflector 1121 and affecting the display effect of the display module 1, the thickness of the sealing plate 141 is less than or equal to the depth of the indentation area 1114. Preferably, in the embodiment provided by the present application, as shown in FIG. 9, the thickness of the sealing plate 141 is equal to the thickness of the indentation area 1114, which can ensure the sealing effect of the sealing plate 141 without affecting the display effect.

It is understandable that the greater the depth of the indentation area 1114, the greater the thickness of the sealing plate 141, a too large thickness will increase the weight of the sealing plate 141, which is not conducive to reducing the weight of the display module 1. When the sealing plate 141 is disposed on the first side surface 1111a of the bottom wall 1111 away from the backlight assembly 112, the excessive thickness of the sealing plate 141 will increase the overall thickness of the display module 1 and affect its lightness and thinness.

Preferably, in the embodiment provided by this application, the depth of the indentation area 1114 is greater than or equal to 0.05 mm and less than or equal to 0.1 mm, and the thickness of the sealing plate 141 is greater than or equal to 0.02 mm and less than or equal to 0.05 mm Therefore, the sealing plate 141 can be made to be light enough so that it does not affect the weight reduction of the display module 1. In addition, this prevents the sealing plate 141 from being too thin, causing it to be easily damaged, and the sealing performance of the sealing plate 141 is ensured.

Figure 4:
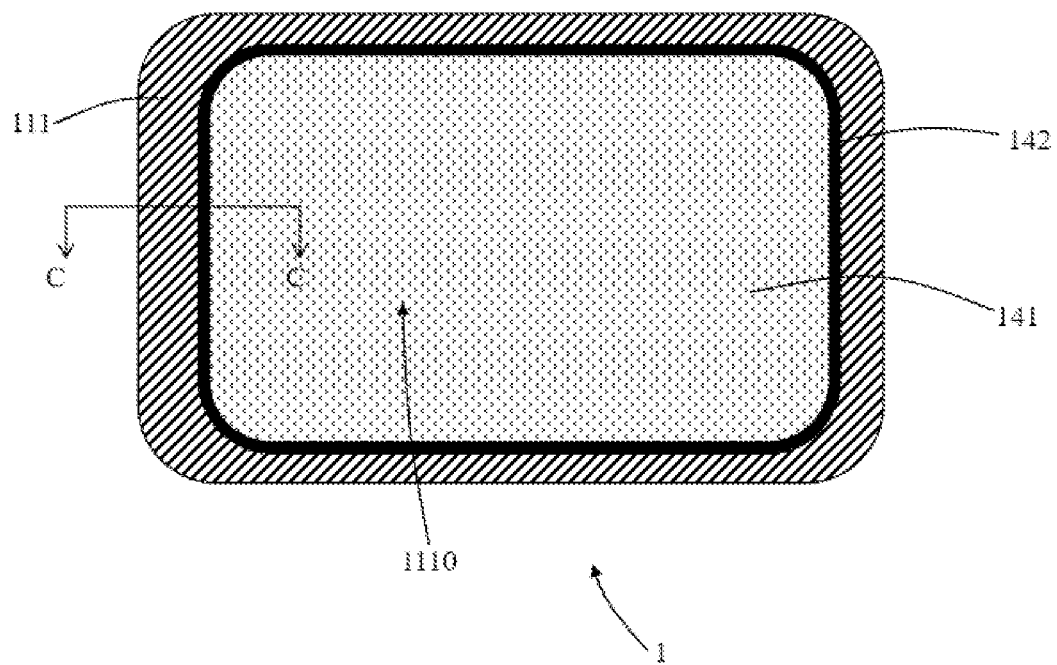
FIG. 4 is a back view of a display module according to a fifth embodiment of this application.

FIG. 4 is a top view of the display module 1 according to the fifth embodiment of this application. FIG. 10 is a structural schematic diagram at cross-section C of FIG. 4. Please refer to FIG. 4 and FIG. 10 together. In the fifth embodiment provided by this application, an adhesive layer 142 is disposed on the surface of the bottom wall 1111 corresponding to the sealing plate 141, and the surface of the sealing plate 141 facing the bottom wall 1111 is attached to the adhesive layer 142. That is, the sealing plate 141 and the bottom wall 1111 are fixedly connected by the adhesive layer 142.

By providing an adhesive layer 142 between the bottom wall 1111 and the sealing plate 141, the sealing plate 141 can be more firmly fixed on the backplate 111, while the adhesive layer 142 is filled between the sealing plate 141 and the bottom wall 1111, which helps to improve the sealing performance.

Please refer to FIG. 4, the adhesive layer 142 extends along a circumferential direction of the sealing plate 141 to form a ring structure. That is, the adhesive layer 142 has a square closed structure around the sealing plate 141, thereby helping to improve the sealing effect of the sealing plate 141 and ensuring the sealing performance. The adhesive layer 142 may be formed by sticking a double-sided tape or may be formed by applying an adhesive.

Figure 5:
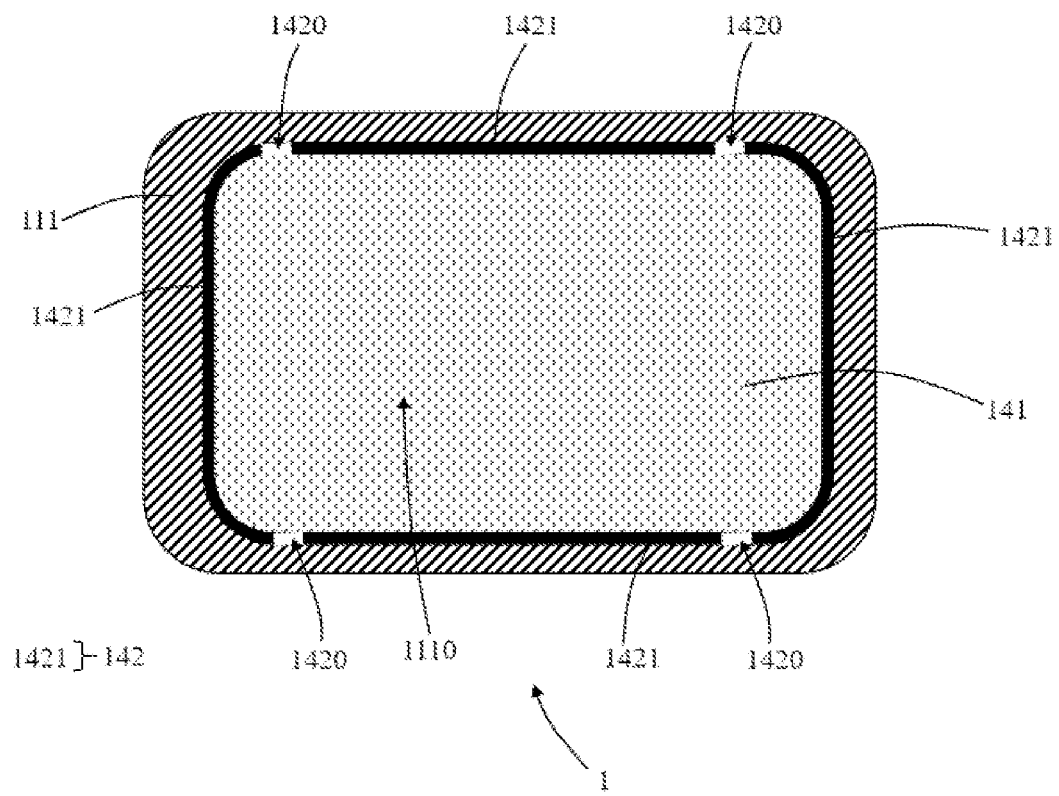
FIG. 5 is a back view of a display module according to a sixth embodiment of this application.

In order to save the manufacturing cost of the display module 1, in the sixth embodiment of the present application, the adhesive layer 142 includes a plurality of sticking sections 1421 distributed along the circumference direction of the sealing plate 141 and two adjacent sticking sections 1421 are arranged at intervals. As shown in FIG. 5, the adhesive layer 142 adopts a splicing design, which includes multiple sticking sections 1421 that are disconnected from each other. There are splicing seams between two adjacent sticking sections 1421 so that the material of the adhesive layer 142 can be reduced, and the manufacturing cost of the display module 1 can be reduced.

In order not to affect the sealing effect, when the adhesive layer 142 adopts a splicing design, the distance between two adjacent sticking sections 1421 should not be too large. Preferably, the gap 1420 between two adjacent sticking sections 1421 is less than or equal to 0.2 mm.

The above provides a detailed introduction to this application. Specific embodiments are provided to illustrate the principles and implementation of this application, and the description of the embodiments is only used to help understand the technical solutions and core ideas of this application. Those of ordinary skill in the art should understand it is still possible to modify the technical solutions recited in the foregoing embodiments, or equivalently replace some of the technical features. However, these modifications or replacements do not cause the essence of the corresponding technical solutions to deviate from the scope of the technical solutions of the embodiments of the present application.

What is claimed is:

1. A display module, comprising:
   a backlight module comprising a backplate and a backlight assembly, wherein the backplate comprises a bottom wall and side walls provided on side edges of the bottom wall, the bottom wall and the side walls enclose an accommodation space, the bottom wall has a hollow area, the backlight assembly is disposed in the accommodation space, and the backlight assembly comprises a light reflector and a light guide plate stacked on the bottom wall;
   a display panel disposed on a side of the backlight assembly away from the bottom wall; and
   a sealing structure connected with the bottom wall and sealing the accommodation space,
      wherein the sealing structure comprises a sealing plate connected to the bottom wall and covering the hollow area to seal the hollow area,
      the bottom wall has a side surface close to the backlight assembly, the side surface is recessed close to an edge of the hollow area to form an indentation area, and an edge of the sealing plate is connected with a bottom surface of the indentation area,
      a thickness of the sealing plate is less than or equal to a depth of the indentation area, the depth of the indentation area is greater than or equal to 0.05 mm and less than or equal to 0.1 mm, and
      the thickness of the sealing plate is greater than or equal to 0.02 mm and less than or equal to 0.05 mm.

2. A display module, comprising:
   a backlight module comprising a backplate and a backlight assembly, wherein the backplate comprises a bottom wall and side walls provided on side edges of the bottom wall, the bottom wall and the side walls encircle an accommodation space, and the bottom wall has a hollow area; and
   a display panel disposed on a side of the backlight assembly away from the bottom wall;
   a sealing structure connected with the bottom wall and sealing the accommodation space,
      wherein the sealing structure comprises a sealing plate connected to the bottom wall and covering the hollow area to seal the hollow area,
      the bottom wall has a side surface close to the backlight assembly, the side surface is recessed close to an edge of the hollow area to form an indentation area, and an edge of the sealing plate is connected with a bottom surface of the indentation area,
      a thickness of the sealing plate is less than or equal to a depth of the indentation area,
      the depth of the indentation area is greater than or equal to 0.05 mm and less than or equal to 0.1 mm, and
      the thickness of the sealing plate is greater than or equal to 0.02 mm and less than or equal to 0.05 mm.

3. The display module according to claim 2, wherein an adhesive layer is disposed on a surface of the bottom wall corresponding to the sealing plate, and a surface of the sealing plate facing the bottom wall is attached to the adhesive layer.

4. The display module according to claim 3, wherein the adhesive layer comprises sticking sections distributed along a circumferential direction of the sealing plate, and adjacent two of the sticking sections are arranged at intervals.

5. The display module according to claim 4, wherein a gap between two adjacent sticking sections is less than or equal to 0.2 mm.

6. The display module according to claim 3, wherein the adhesive layer extends along a circumferential direction of the sealing plate to form a ring structure.

7. The display module according to claim 2, wherein a thickness of the backplate is greater than or equal to 0.15 mm and less than or equal to 0.3 mm.

8. The display module according to claim 2, wherein a material of the sealing plate comprises resin.

* * * * *